Dec. 12, 1967  M. MARTIN  3,357,085
TOOL FOR REMOVING WIPER BLADE ARM
Filed Aug. 6, 1965
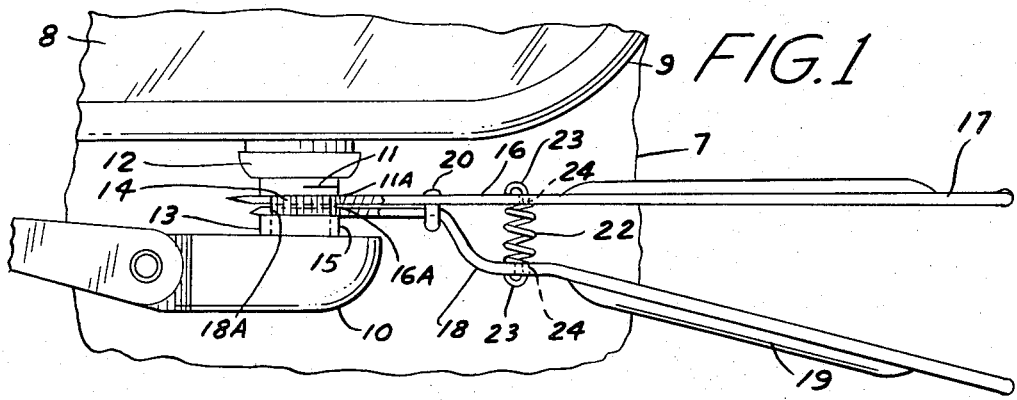
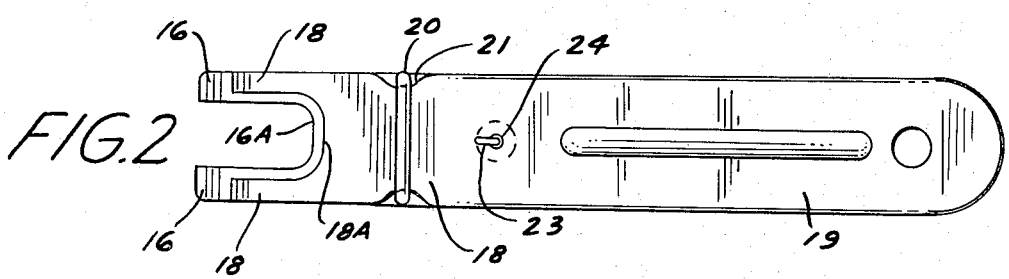
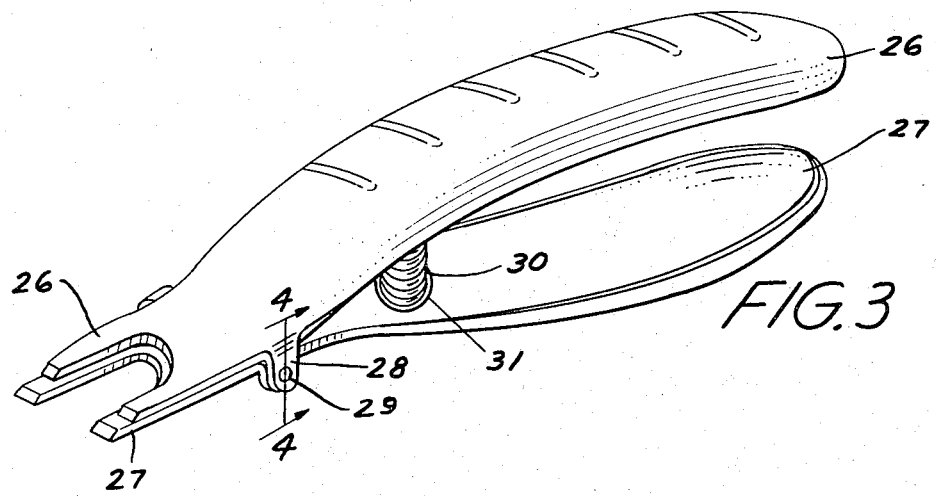
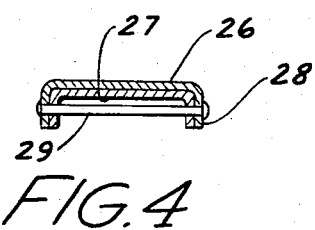
INVENTOR
MARCUS MARTIN
BY Edward M. Apple
ATTORNEY United States Patent Office 3,357,085
Patented Dec. 12, 1967

3,357,085
TOOL FOR REMOVING WIPER BLADE ARM
Marcus Martin, 216 Orchard Drive,
Monroe, Mich. 48161
Filed Aug. 6, 1965, Ser. No. 477,914
1 Claim. (Cl. 29—239)

ABSTRACT OF THE DISCLOSURE

This application discloses a tool for removing a wiper blade arm from its fitting on an automotive vehicle body. It discloses a pair of equal length levers pivoted near one end, and spring biased near the pivot point, with flat contacting portions on the levers ahead of the pivot point, the flat portions having cut outs of different width and depth.

---

This invention relates to hand tools and has particular reference to a tool for removing windshield wiper arms from a motor vehicle, although it may be used for other purposes, such as removing the trim molding, or trim panels from an automobile body.

Heretofore it has been the practice of automobile mechanics to use a screwdriver, or a pry bar, to lift off the windshield wiper arm when a replacement or repair was to be made. Such practice oftentimes resulted in damage to the finish of the car, or damage to the part being removed, or the parts associated therewith.

It is therefore, an object of this invention to obviate the foregoing difficulties and to provide a hand tool for removing the windshield wiper arm, which is simple in construction, economical to manufacture, and efficient in operation.

Another object of the invention is the provision of a hand tool which may effectively be used in any operation where a part, or element, must be separated from another element which has a frictional, or other light, attachment between the parts.

The foregoing and other objects and advantages of the invention will appear more apparent as the description proceeds, reference being made from time to time to the accompanying drawing, forming part of the within disclosure, in which drawing:

FIG. 1 is a fragmentary perspective view of a vehicle, having a windshield, and a windshield wiper arm, which is to be removed with the tool embodying the invention.

FIG. 2 is a bottom plan view of the tool shown in FIG. 1.

FIG. 3 is a perspective view of a modified form of the invention.

FIG. 4 is a section taken substantially along the line 4—4 of FIG. 3.

Referring now more particularly to the drawing, it will be understood that in the embodiment herein disclosed, the reference character 7 indicates the hood of a motor vehicle, having a windshield 8, windshield molding 9, a windshield wiper arm 10, the latter being mounted on a spindle 11, which extends through the vehicle body below the windshield, and which is driven by an electric motor, or other means, not shown, on the interior of the vehicle body.

The spindle 11 is housed in a fitting 12. The spindle 11 has a reduced, in diameter, portion 13, which is fluted as at 14, which fluted portion extends into a socket 15, formed on the arm 10.

The elements just described are conventional parts of a motor vehicle and comprise no part of the invention, except as they are combined with the elements hereinafter described.

The removal of the socket 15 of the arm 10 from the fluted extension, of the spindle 11, presents a difficult problem because the parts are usually under spring tension and oftentimes are weathered, or corroded, which makes the removal task that much more difficult.

As indicated above, it has been the practice of auto mechanics to insert a screwdriver under the socket 15, and exert pressure on the parts in an effort to pry them apart. Oftentimes the screwdriver would slip and damage the finish on the vehicle, or if the hood were used as a fulcrum, in such prying operation even the metal would become damaged.

It is, therefore, the object of the invention to obviate these difficulties, and in carrying out my invention I have devised a novel hand tool for accomplishing the desired result. The invention resides in the provision of a hand tool which consists of a straight lever 16, terminating in a hand grip 17, and an offset lever 18, terminating in a hand grip 19. The offset lever 18 is secured to the straight lever 16 for pivotal movement, by means of a metal strap 20, which encircles the levers, and is received in cut outs 21, formed in the edges of the levers.

The levers are normally held in the position, shown in FIG. 1, by means of a spring 22, the terminal ends 23 of which are extended through suitable apertures 24 formed in the levers and then bent over.

In FIG. 2 it will be noted that the flat section of each lever 16 and 18 is provided with a cut out portion 16A and 18A. The cut out portion 16A of the lever 16 being somewhat more narrow and of greater depth than the cut out portion 18A of the lever 18, so that when the device is in the position as shown in FIG. 1 ready for removing the arm 10 from the spindle 11, the cut out portion 16A is received over the fluted spindle extension 13, and rests on the enlarged portion or shoulder 11A of the spindle 11, and the edges of the cut out portion 18A of the lever 18 abut the face of the arm socket 15, so that when pressure is exerted on the hand grips 17 and 19 the opposite end of the lever 18 will rock away from the lever 16, forcing the socket 15 to separate from the spindle 11 to free the arm 10 in such a manner that no part of the tool comes in contact with a finished part of the vehicle.

In FIG. 3, I show a modified form of the invention in which the levers 26 and 27 are provided with depending ears 28, which have apertures therein arranged to receive a pin 29, which serves as a pivot for the levers.

A spring 30, which is suitably mounted in cups 31, normally keeps the levers 26 and 27 in the position shown in FIG. 3.

It is believed that the operation of the device is obvious from the foregoing description.

Having described my invention, what I claim and desire to secure by Letters Patent is:

A windshield wiper tool of the character described comprising a pair of pivoted levers lying on opposite sides of a common plane, terminating at one end in hand grips and at the other end in thin, flat members, each having a cut out portion for receiving the spindle of a windshield wiper mechanism, one of said levers being longer than the other, the cut out portion of the shorter lever being of less depth and wider than the cut out portion of the longer lever, the hand grip portions of said levers being curved and the levers being provided with pairs of depending apertured ears extending in the same direction, there being a pivot pin extending through said ears and spring means for biasing said hand grips, whereby to normally hold the flat portions of said levers tightly together.

References Cited

UNITED STATES PATENTS

| | | | |
|---|---|---|---|
| 1,044,517 | 11/1912 | Hallgren | 29—221 |
| 1,356,194 | 10/1920 | Deliman | 29—221 |
| 1,608,883 | 11/1926 | Justus | 29—221 |
| 1,721,451 | 7/1929 | Johnson | 29—221 |
| 1,960,878 | 5/1934 | Rush | 29—221 |
| 2,342,479 | 2/1944 | Miles et al. | 81—5.1 |

FOREIGN PATENTS 1,249,250  11/1960  France.

WILLIAM FELDMAN, *Primary Examiner.*

J. C. PETERS, *Assistant Examiner.*